(12) United States Patent
Sakhnini et al.

(10) Patent No.: US 12,389,254 B2
(45) Date of Patent: Aug. 12, 2025

(54) LAYER 1 MEASUREMENT REPORTING USING MEASUREMENT INDEX

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Wooseok Nam, San Diego, CA (US); Yan Zhou, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/223,453

(22) Filed: Apr. 6, 2021

(65) Prior Publication Data
US 2021/0352506 A1 Nov. 11, 2021

Related U.S. Application Data

(60) Provisional application No. 63/021,619, filed on May 7, 2020.

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04B 17/318* (2015.01);
(Continued)

(58) Field of Classification Search
CPC .............. H04W 24/10; H04W 56/001; H04W 72/0413; H04W 72/046; H04W 72/042; H04W 36/0058; H04W 36/0055; H04W 36/30; H04W 36/0088; H04W 36/0094; H04W 36/24; H04W 84/045; H04W 16/28; H04W 76/11; H04W 76/27; H04W 52/0212; H04L 5/0057; H04L 5/0048; H04L 5/0053; H04L 5/0055;
(Continued)

(56) References Cited

U.S. PATENT DOCUMENTS

| 8,495,060 B1 * | 7/2013 | Chang | G06Q 10/00 707/723 |
| 2013/0229931 A1 * | 9/2013 | Kim | H04L 5/0053 370/252 |

(Continued)

FOREIGN PATENT DOCUMENTS

| CN | 111757374 A | * | 10/2020 | |
| WO | WO-2021134455 A1 | * | 7/2021 | ............ H04W 24/08 |

*Primary Examiner* — Un C Cho
*Assistant Examiner* — Rasha K Fayed
(74) *Attorney, Agent, or Firm* — Arun Swain

(57) ABSTRACT

Various aspects of the present disclosure generally relate to wireless communication. In some aspects, a user equipment may generate a Layer 1 measurement report identifying one or more measurements by corresponding measurement indices, refrain from including a measurement value in the Layer 1 measurement report for at least one measurement, and transmit the Layer 1 measurement report. Numerous other aspects are provided.

30 Claims, 6 Drawing Sheets

(51) Int. Cl.
   *H04B 17/318*   (2015.01)
   *H04B 17/336*   (2015.01)
   *H04W 56/00*   (2009.01)
   *H04W 72/21*   (2023.01)

(52) U.S. Cl.
   CPC ........ *H04B 17/336* (2015.01); *H04W 56/001* (2013.01); *H04W 72/21* (2023.01)

(58) Field of Classification Search
   CPC . H04L 5/0094; H04L 25/0224; H04L 1/0026; H04L 1/0027; H04L 1/1854; H04B 7/0626; H04B 7/0695; H04B 7/088; H04B 7/0456; H04B 17/318; H04B 17/336; H04B 17/24; Y02D 30/70
   See application file for complete search history.

(56) References Cited

U.S. PATENT DOCUMENTS

| | | | | |
|---|---|---|---|---|
| 2014/0098689 | A1* | 4/2014 | Lee | H04W 24/08 370/252 |
| 2015/0333893 | A1* | 11/2015 | Lee | H04B 7/0486 370/252 |
| 2016/0037511 | A1* | 2/2016 | Vincze | H04W 72/27 370/329 |
| 2016/0119915 | A1* | 4/2016 | Simonsson | H04W 72/085 370/329 |
| 2017/0055196 | A1* | 2/2017 | Fu | H04W 36/26 |
| 2017/0366377 | A1* | 12/2017 | Papasakellariou | H04L 27/2613 |
| 2017/0374574 | A1* | 12/2017 | Lee | H04W 24/08 |
| 2018/0097664 | A1* | 4/2018 | Lin | H04L 25/0224 |
| 2018/0234959 | A1* | 8/2018 | Ahn | H04W 72/20 |
| 2018/0241523 | A1* | 8/2018 | Noh | H04B 7/0626 |
| 2018/0287682 | A1* | 10/2018 | Kwak | H04L 5/0057 |
| 2019/0037425 | A1* | 1/2019 | Hong | H04W 24/08 |
| 2019/0053089 | A1* | 2/2019 | Kwak | H04W 72/23 |
| 2019/0373614 | A1* | 12/2019 | Yum | H04W 72/53 |
| 2019/0379503 | A1* | 12/2019 | Kang | H04W 72/042 |
| 2020/0236729 | A1* | 7/2020 | Ahn | H04W 16/14 |
| 2020/0412431 | A1* | 12/2020 | Park | H04B 7/0469 |
| 2021/0028823 | A1* | 1/2021 | Park | H04W 8/24 |
| 2021/0195451 | A1* | 6/2021 | Da Silva | H04W 36/0085 |
| 2021/0218540 | A1* | 7/2021 | Song | H04W 24/10 |
| 2021/0227418 | A1* | 7/2021 | Hwang | H04W 24/10 |
| 2021/0306043 | A1* | 9/2021 | Damnjanovic | H04W 72/21 |
| 2021/0314038 | A1* | 10/2021 | Matsumura | H04B 7/0602 |
| 2021/0359726 | A1* | 11/2021 | Chen | H04W 24/10 |
| 2021/0376894 | A1* | 12/2021 | Cha | H04B 7/0619 |
| 2021/0400508 | A1* | 12/2021 | Ohara | H04W 52/0245 |
| 2022/0167231 | A1* | 5/2022 | You | H04W 36/00835 |
| 2022/0183079 | A1* | 6/2022 | Ouchi | H04W 74/006 |
| 2022/0232549 | A1* | 7/2022 | Yeo | H04L 5/0044 |
| 2022/0286175 | A1* | 9/2022 | Matsumura | H04B 7/0888 |
| 2022/0330075 | A1* | 10/2022 | Yan | H04W 24/10 |
| 2022/0345198 | A1* | 10/2022 | Yang | H04B 7/0695 |

* cited by examiner

LAYER 1 MEASUREMENT REPORTING USING MEASUREMENT INDEX

CROSS-REFERENCE TO RELATED APPLICATION

This Patent Application claims priority to U.S. Provisional Patent Application No. 63/021,619, filed on May 7, 2020, entitled "LAYER 1 MEASUREMENT REPORTING USING MEASUREMENT INDEX," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for Layer 1 measurement reporting using a measurement index.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include generating a Layer 1 measurement report identifying one or more measurements by corresponding measurement indices; refraining from including a measurement value in the Layer 1 measurement report for at least one measurement; and transmitting the Layer 1 measurement report.

In some aspects, a method of wireless communication, performed by a base station, may include receiving, from a UE, a Layer 1 measurement report identifying one or more measurements by corresponding measurement indices; and determining that the UE has refrained from including a measurement value in the Layer 1 measurement report for at least one measurement.

In some aspects, a UE for wireless communication may include a memory and one or more processors coupled to the memory. The memory and the one or more processors may be configured to generate a Layer 1 measurement report identifying one or more measurements by corresponding measurement indices; refrain from including a measurement value in the Layer 1 measurement report for at least one measurement; and transmit the Layer 1 measurement report.

In some aspects, a base station for wireless communication may include a memory and one or more processors coupled to the memory. The memory and the one or more processors may be configured to receive, from a UE, a Layer 1 measurement report identifying one or more measurements by corresponding measurement indices; and determine that the UE has refrained from including a measurement value in the Layer 1 measurement report for at least one measurement.

In some aspects, a non-transitory computer-readable medium may store one or more instructions for wireless communication. The one or more instructions, when executed by one or more processors of a UE, may cause the UE to generate a Layer 1 measurement report identifying one or more measurements by corresponding measurement indices; refrain from including a measurement value in the Layer 1 measurement report for at least one measurement; and transmit the Layer 1 measurement report.

In some aspects, a non-transitory computer-readable medium may store one or more instructions for wireless communication. The one or more instructions, when executed by one or more processors of a base station, may cause the base station to receive, from a UE, a Layer 1 measurement report identifying one or more measurements by corresponding measurement indices; and determine that the UE has refrained from including a measurement value in the Layer 1 measurement report for at least one measurement.

In some aspects, an apparatus for wireless communication may include means for generating a Layer 1 measurement report identifying one or more measurements by corresponding measurement indices; means for refraining from including a measurement value in the Layer 1 measurement report for at least one measurement; and means for transmitting the Layer 1 measurement report.

In some aspects, an apparatus for wireless communication may include means for receiving, from a UE, a Layer 1 measurement report identifying one or more measurements by corresponding measurement indices; and means for determining that the UE has refrained from including a measurement value in the Layer 1 measurement report for at least one measurement.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
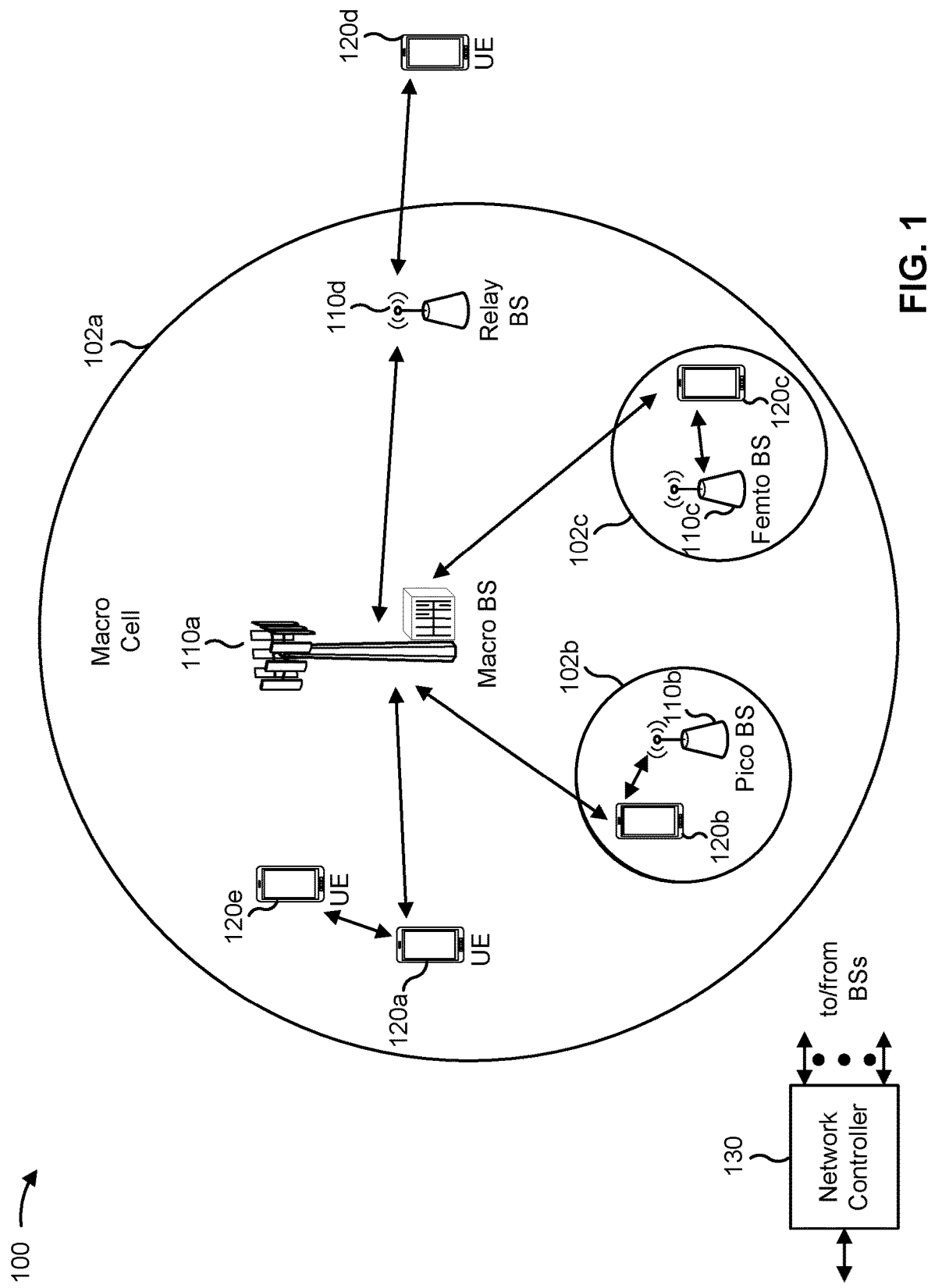
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
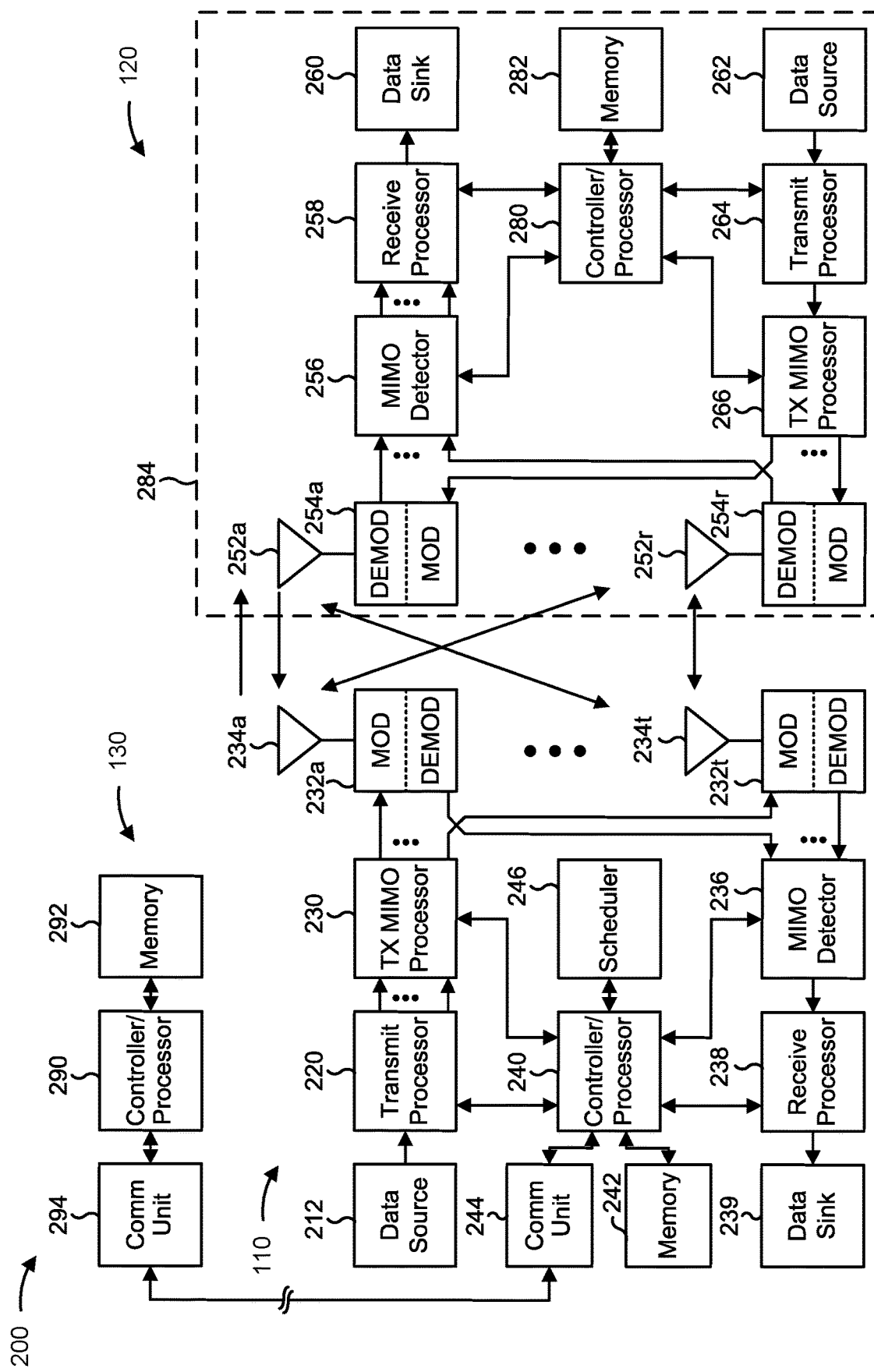
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with Layer 1 measurement reporting using a measurement index, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for generating a Layer 1 measurement report identifying one or more measurements by corresponding measurement indices, means for refraining from including a measurement value in the Layer 1 measurement report for at least one measurement, means for transmitting the Layer 1 measurement report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a Layer 1 measurement report identifying one or more measurements by corresponding measurement indices, means for determining that the UE has refrained from including a measurement value in the Layer 1 measurement report for at least one measurement, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
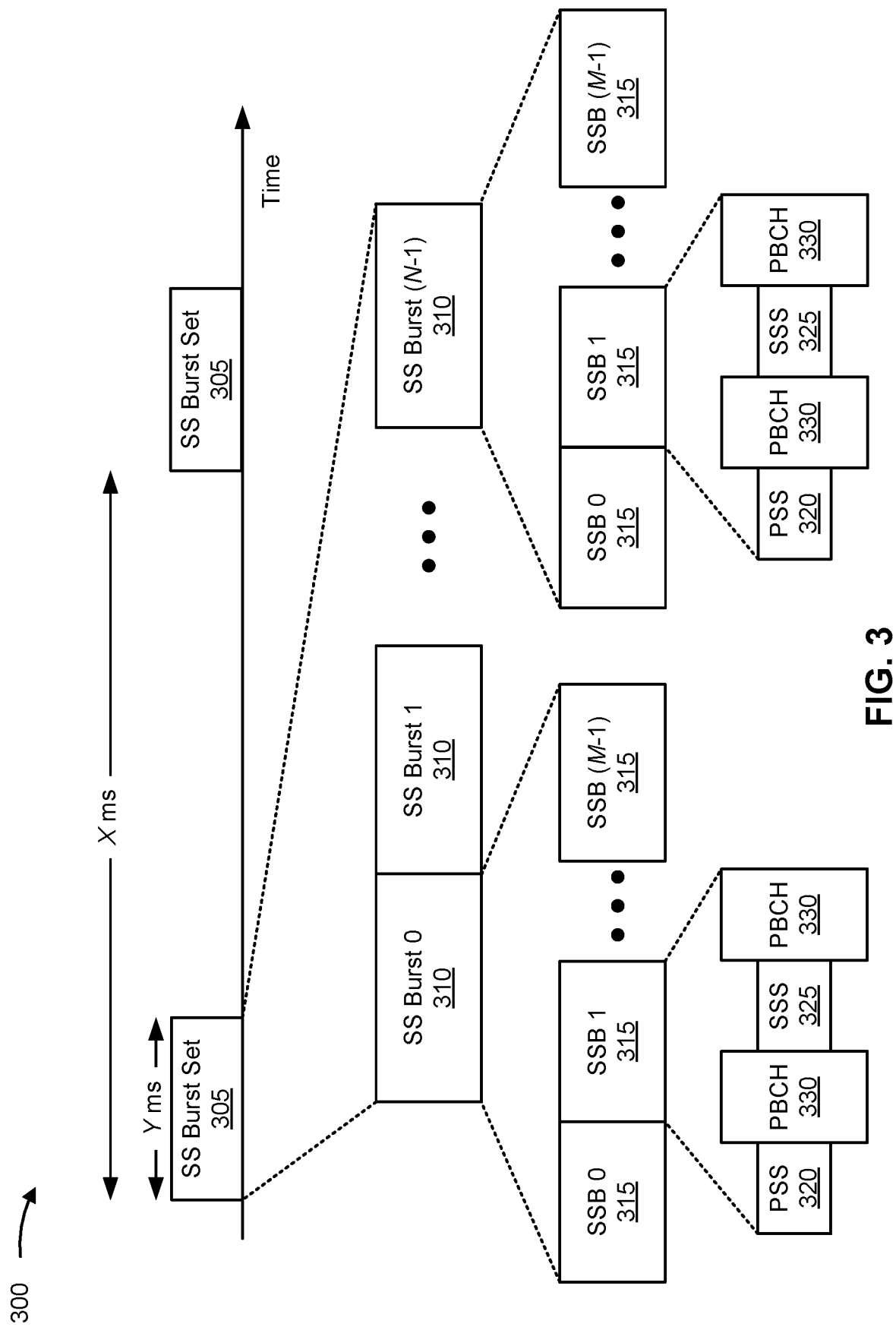
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window, an SSB measurement time configuration (SMTC) window, and/or the like.

In some aspects, an SSB 315 may include resources that carry a primary synchronization signal (PSS) 320, a secondary synchronization signal (SSS) 325, and/or a physical broadcast channel (PBCH) 330, among other examples. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., a reference signal received power (RSRP) parameter and/or the like) to a base station 110. The base station 110 and the UE 120 may use the one or more indicated SSBs 315 to select one or more beams to be used for communication between the base station 110 and the UE 120 (e.g., for a random access channel (RACH) procedure and/or the like). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

In some wireless networks, a UE may be configured to transmit one or more channel state information (CSI) reports. CSI measurement and reporting may be based at least in part on a CSI report configuration. A CSI report configuration may be semi-statically configured (e.g., using radio resource control (RRC) signaling and/or the like). The CSI report configuration may identify a periodicity for CSI reporting, a reference signal for CSI reporting, a resource associated with CSI reporting, and/or the like. CSI reporting can be performed periodically, semi-persistently, or aperiodically. Aperiodic CSI reporting can be triggered, whereas periodic and semi-persistent CS1 reporting can be configured to be performed in accordance with an interval.

The CSI measurement may be based at least in part on a Layer 1 measurement, such as a Layer 1 reference signal received power (RSRP), a Layer 1 signal-to-interference-plus-noise ratio (SINR) value, a channel quality indicator (CQI), a precoding matrix indicator (PMI), a CSI reference signal (CSI-RS) resource indicator (CRI), a strongest layer indication (SLI), and/or a rank indication (RI), among other examples. L1-RSRP and/or L1-SINR may be used for beam selection based at least in part on interference. "Layer 1" and "L1" may be used interchangeably herein.

With the implementation of NR, the size of CSI feedback has grown, relative to earlier radio access technologies. For example, CSI feedback may carry L1-RSRP and L1-SINR information, which may carry information regarding multiple beams and thus may be large in size (e. g., approximately 20 bits, in some aspects). When combined with a periodic CSI report, the larger size of CSI feedback in NR may cause coverage issues and poor throughput. In some aspects, a UE may be stationary (e.g., an industrial sensor UE, and/or a video surveillance UE, among other examples), and/or may have a predefined motion pattern (e.g., a rotational pattern, and/or a track (such as for a high-speed train), among other examples), among other examples, such that the UE has only a limited quantity of beams that the UE is capable of accessing. For example, the UE may be a reduced capability NR device, such as a reduced capability (RedCap) UE, an Internet of Things (IoT) UE, and/or a machine-type communication UE, among other examples.

Some techniques and apparatuses described herein provide for Layer 1 measurement reporting (e.g., L1-RSRP and/or L1-SINR) using only a measurement index. For example, the UE may identify a measurement using a measurement index, and may refrain from including a measurement value for the measurement in the Layer 1 measurement report. As the UE may be associated with a limited beam set, a base station may be enabled to perform beam selection for the UE without reported measurement values. In this way, a size of the Layer 1 measurement report may be reduced. This may enable the UE to improve coverage for the UE (e.g., based at least in part on using the bits that would have otherwise been used reporting the larger Layer 1 measurement report for another purpose). Furthermore, power consumption and overhead associated with generating and/or transmitting Layer 1 measurement reports may be reduced.

Figure 4:
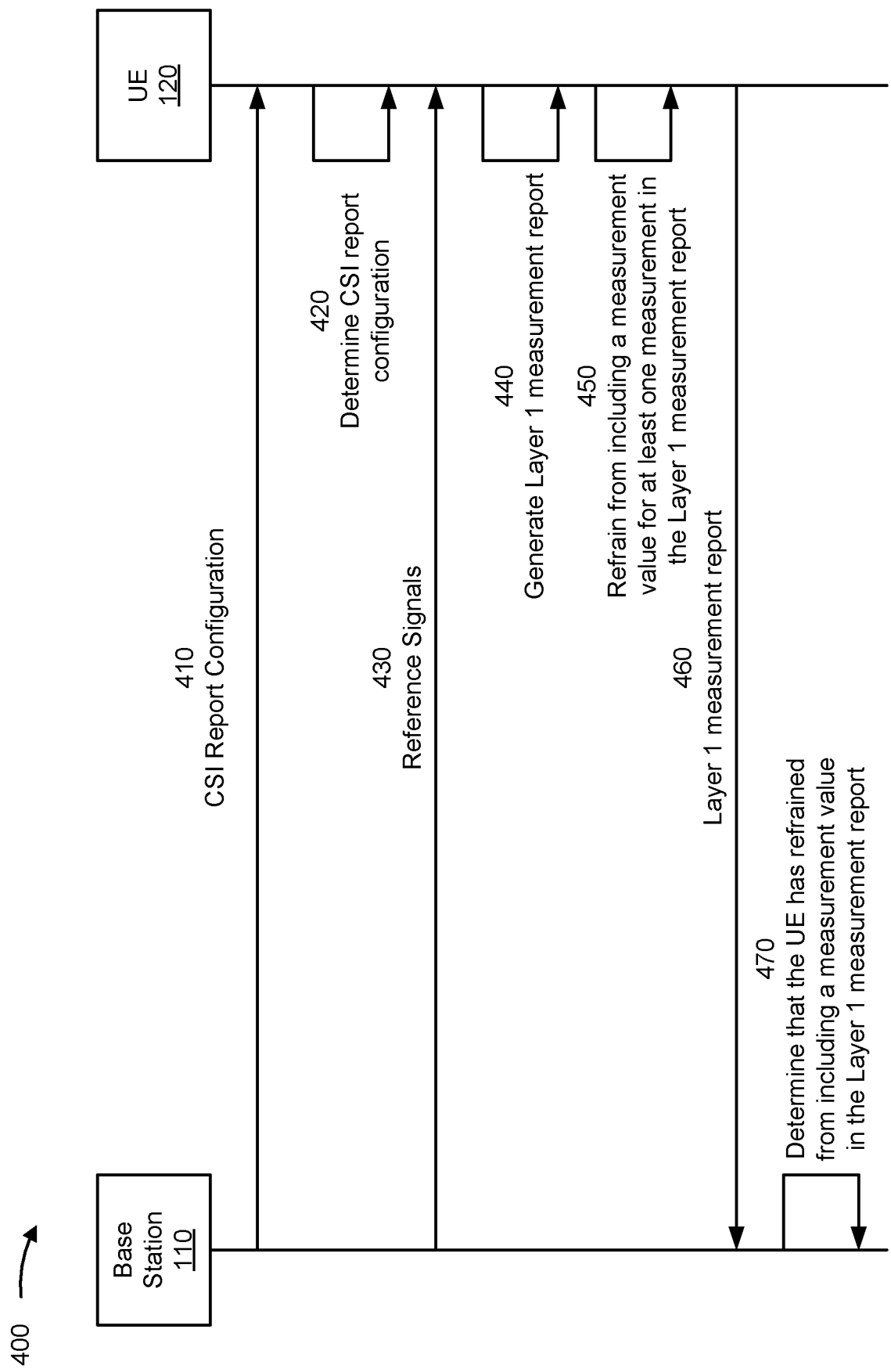
FIG. 4 is a diagram illustrating an example of Layer 1 measurement reporting using a measurement index, in accordance with the present disclosure.

FIG. 4 is a diagram illustrating an example 400 of Layer 1 measurement reporting using a measurement index, in accordance with the present disclosure. As shown in FIG. 4, a base station 110 and a UE 120 may communicate with one another in a wireless network (e.g., wireless network 100).

As show by reference number 410, the base station 110 may transmit a CSI report configuration to the UE 120. The CSI report configuration may indicate a CSI report setting (e.g., aperiodic, semi-persistent, and/or periodic). The CSI report configuration may indicate that the UE 120 is to perform Layer 1 CSI reporting. For example, the CSI report configuration may indicate that the CSI reporting may be performed using a Layer 1 measurement report, such as a CSI report that carries L1-RSRP information, L1-SINR information, or another form of Layer 1 measurement information.

In some aspects, the CSI report configuration may be transmitted by the base station 110 via semi-static signaling (e.g., using RRC signaling). In some aspects, the base station 110 may trigger and/or activate (e.g., for semi-persistent CSI reports and/or periodic CSI reports) the UE 120 to perform Layer 1 CSI reporting using dynamic signaling (e.g., using downlink control information (DCI), and/or a medium access control (MAC) control element (CE)).

In some aspects, the CSI report configuration may indicate a CSI resource setting. The CSI resource setting may indicate one or more reference signal resources that the UE 120 is to measure and report in the CSI report. For example, the CSI resource setting may indicate multiple CSI-RS resource sets and/or multiple SSB block resources. In some aspects, the CSI report configuration may indicate a quantity of measurements (e.g., 1 measurement, 2 measurements, 4 measurements, and/or the like) to be included in the measurement report. The quantity of measurements to be included in the report may be associated with a CSI report setting (e.g., a UE 120 may be configured to report a quantity of measurements associated with a first CSI report setting, and/or a quantity of measurements associated with a second CSI report setting, among other examples).

In some aspects, the CSI report configuration may indicate a threshold measurement value (e.g., a threshold RSRP value, and/or a threshold SINR value, among other examples) associated with the CSI report. The threshold measurement value may indicate measurements to be included in a measurement report (e.g., only measurements with measurement values that satisfy the threshold measurement value are to be included in the measurement report).

As shown by reference number 420, the UE 120 may determine the CSI report configuration. For example, the UE 120 may receive the CSI report configuration, identify one or more CSI report settings, and/or identify one or more CSI resource settings, among other examples. The UE 120 may be configured to perform the Layer 1 measurements (e.g., L1-RSRP measurements and/or L1-SINR measurements) according to the CSI report configuration. For example, the UE 120 may be configured to perform and report the Layer 1 measurements periodically, perform and report the Layer 1 measurements based at least in part on a trigger (e.g., for aperiodic CSI reporting) received from the base station 110, and/or perform and report the Layer 1 measurements based at least in part on an activation (e.g., for semi-persistent CSI reporting) received from the base station 110, among other examples.

As shown by reference number 430, the base station 110 may transmit a plurality of reference signals. The reference signals may be transmitted by the base station 110 using the resource sets indicated by the CSI resource setting. The reference signals may include CSI-RSs, and/or SSBs, among other examples. The reference signals may correspond to a CSI report setting. For example, the reference signals may be periodic reference signals, semi-persistent reference signals, and/or aperiodic reference signals. Measurements for different CSI report settings may use different types of reference signals. For example, aperiodic CSI reporting may use aperiodic reference signals, semi-persistent reference signals, or periodic reference signals. Semi-persistent CSI reporting may use semi-persistent reference signals or periodic reference signals (e.g., not aperiodic reference signals). Periodic CSI reporting may use only periodic reference signals (e.g., not semi-persistent reference signals or aperiodic reference signals). The UE 120 may determine Layer 1 measurement information (e.g., an L1-RSRP, an L1-SINR, and/or the like) for one or more (or all) of the plurality of reference signals.

As shown by reference number 440, the UE 120 may generate the Layer 1 measurement report. The Layer 1 measurement report may include one or more measurements of reference signals performed by the UE 120. A measurement in the measurement report may be identified by a measurement index. A measurement index may be a CSI-RS index, an SSB index, a CSI-RS resource indicator (CRI), and/or an SSB resource indicator (SSBRI), among other examples. The measurement index may identify a resource set associated with a reference signal, and/or a beam on which the reference signal was transmitted, among other examples.

In some aspects, the UE 120 may determine a quantity of highest measurement values (e.g., highest RSRP, and/or highest SINR) of the measurements performed by the UE 120. The UE 120 may generate the Layer 1 measurement report to include the quantity of the highest measurements. The quantity of the highest measurements may be based at least in part on the quantity of measurements to be included in the measurement report (e.g., indicated by the CSI report configuration). In some aspects, the UE 120 may include measurements in the measurement report based at least in part on the threshold measurement value indicated in the CSI report configuration. That is, if a measurement value does not satisfy the threshold measurement value, the UE 120 may not include the measurement in the Layer 1 measurement report.

In some aspects, the UE 120 may generate the Layer 1 measurement report to indicate a highest measurement value (e.g., using a quantity of bits, such as 7 bits, in the Layer 1 measurement report). The UE 120 may indicate measurement values for the remaining measurements in the Layer 1 measurement report as differential values from the highest measurement value (e.g., using a quantity of bits, such as 4 bits, in the Layer 1 measurement report). As indicated above, the Layer 1 measurement report may include measurements associated with one or more CSI report settings (e.g., the Layer 1 measurement report may include aperiodic measurements, periodic measurements, and/or semi-persistent measurements).

As shown by reference number 450, the UE 120 may refrain from including a measurement value for at least one measurement in the Layer 1 measurement report. That is, the UE 120 may identify the measurement (e.g., identified by a measurement index associated with the measurement) in the Layer 1 measurement report, but not include a measurement value associated with the measurement. The UE 120 may refrain from including a measurement value in the Layer 1 measurement report for at least one measurement based at least in part on a CSI report setting associated with the at least one measurement. In some aspects, the UE 120 may include a measurement value in the Layer 1 measurement report for at least one other measurement based at least in part on a CSI report setting associated with the at least one other measurement. For example, a Layer 1 measurement report may include aperiodic measurements and periodic measurements. The UE 120 may include measurement values for each aperiodic measurement included in the Layer 1 measurement report and may refrain from including measurement values for each periodic measurement included in the Layer 1 measurement report (e.g., and instead may include measurement indices associated with the periodic measurements). In some aspects, the UE 120 may refrain from including a measurement value in the Layer 1 measurement report for each measurement included in the Layer 1 measurement report (e.g., for each CSI report setting included in the Layer 1 measurement report).

As a result, the Layer 1 measurement report may be associated with a reduced payload size. For example, the UE 120 may refrain from including one or more measurement values in the Layer 1 measurement report that are associated with a payload size (e.g., 7 bits, 4 bits, and/or another number of bits). By refraining from including the measurement values in the Layer 1 measurement report, the payload size of the Layer 1 measurement report may be reduced.

The UE 120 may order measurement indices (e.g., associated with measurements that do not include a measurement value) in the Layer 1 measurement report based at least in part on the measurement value associated with the measurement indices. That is, the UE 120 may determine a measurement value for each of the measurements associated with the measurement indices and may order the measurement indices in the Layer 1 measurement report according to the measurement values. In some aspects, the UE 120 may order the measurement indices in order of decreasing measurement values (e.g., from a highest measurement value to a lowest measurement value). In some aspects, the UE 120 may order the measurement indices according to an order indicated by the base station 110 (e.g., in the CSI report configuration and/or the like). In this way, the base station 110 may be enabled to determine a rank or order of measurement values associated with the measurement indices without knowing the actual measurement values.

In some aspects, the UE 120 may generate the Layer 1 measurement report to include a quantity of ordered measurement indices (e.g., associated with measurements that do not include a measurement value in the Layer 1 measurement report). The quantity of ordered measurement indices may be based at least in part on a quantity of measurements to be included in the Layer 1 measurement report. For example, the base station 110 may indicate that the UE 120 is to include 4 measurements for a particular CSI report setting in a Layer 1 measurement report. The UE 120 may determine the 4 highest measurement values of performed measurements (e.g., of reference signals, as described above) and may include the measurement indices associated with the 4 highest measurement values in the Layer 1 measurement report (e.g., ordered as described above).

In some aspects, the UE 120 may determine the threshold measurement value associated with a CSI report setting (e.g., indicated by the base station 110 in the CSI reporting configuration). The UE 120 may perform the measurements of the reference signals and may include measurements in the Layer 1 measurement report only if the determined measurement values satisfy the threshold measurement value.

In some aspects, the UE 120 may determine that the quantity of measurement values that satisfy the threshold measurement value is less than the quantity of measurements to be included in the Layer 1 measurement report (e.g., the base station 110 may indicate that 4 measurements are to be included in the Layer 1 measurement report, but the UE 120 may determine that only 2 measurement values satisfy the threshold measurement value). The UE 120 may include the quantity of measurement indices associated with measurement values that satisfy the threshold measurement value in the Layer 1 report (e.g., 2 measurement indices, for example). The UE 120 may include a quantity of entries in the Layer 1 measurement report identified by a plurality of zero bits (e.g., a plurality of bits with a value of '0'). The quantity of entries identified by the plurality of zero bits may be based at least in part on the quantity of measurements to be included in the Layer 1 measurement report (e.g., if 2 measurement values satisfy the threshold measurement value and 4 measurements are to be included in the Layer 1 measurement report, the UE 120 may include 2 entries identified by the plurality of zero bits and 2 entries identified by the measurement indices associated with the measurement values satisfy the threshold measurement value).

As shown by reference number 460, the UE 120 may transmit the Layer 1 measurement report to the base station 110. In some aspects, the UE 120 may transmit the Layer 1 measurement report using physical uplink control channel (PUCCH) resources. In some aspects, the UE 120 may transmit the Layer 1 measurement report on a first set of PUCCH resources if the Layer 1 measurement report includes measurement values for each measurement. The UE 120 may transmit the Layer 1 measurement report on a second set of PUCCH resources if the Layer 1 measurement report does not include a measurement value for at least one measurement in the Layer 1 measurement report. In some aspects, the UE 120 may transmit an indication (e.g., with the Layer 1 measurement report or in a separate transmission) that the UE 120 has refrained from including a measurement value for at least one measurement in the Layer 1 measurement report.

As shown by reference number 470, the base station 110 may determine that the UE 120 has refrained from including a measurement value for at least one measurement in the Layer 1 measurement report. The base station 110 may determine that the UE 120 has refrained from including a measurement value for at least one measurement in the Layer 1 measurement report based at least in part on a blind decoding technique (e.g., based at least in part on a payload size of the Layer 1 measurement report, a quantity of bits of the Layer 1 measurement report, and/or the like), based at least in part on an indication received from the UE 120, based at least in part on the PUCCH resources used to transmit the Layer 1 measurement report, and/or the like.

The base station 110 may determine an order of the measurement indices included in the Layer 1 measurement report (e.g., for measurements that do not include a measurement value in the Layer 1 measurement report). For example, the base station 110 may determine that a measurement index ordered first in the Layer 1 measurement report is associated with the highest measurement value determined by the UE 120. The base station 110 may determine that the reference signal and/or beam associated with the measurement index has a highest RSRP, SINR, among other examples.

The base station 110 may be enabled to decode a Layer 1 measurement report that includes less than a quantity of measurements to be included in the Layer 1 measurement report (e.g., based at least in part on less than the quantity of measurements to be included satisfying the threshold measurement value, as described above) based at least in part on the UE 120 including entries identified by a plurality of zero bits. For example, the plurality of zero bits may correspond to a quantity of bits associated with a measurement entry (e.g., the quantity of the plurality of bits may be the same as the quantity of bits used to report a measurement). In this way, the base station 110 may decode the Layer 1 measurement report and determine that a quantity of measurement values that satisfied the threshold measurement value is less than a quantity of measurements to be included in the Layer 1 measurement report.

The base station 110 may perform one or more actions based at least in part on receiving the Layer 1 measurement report and/or based at least in part on determining the order of measurement indices included in the Layer 1 measurement report. For example, the base station 110 may perform a beam switching action (e.g., switch a beam associated with the UE 120) based at least in part on the Layer 1 measurement report.

As indicated above, FIG. 4 is provided as an example. Other examples may differ from what is described with respect to FIG. 4.

Figure 5:
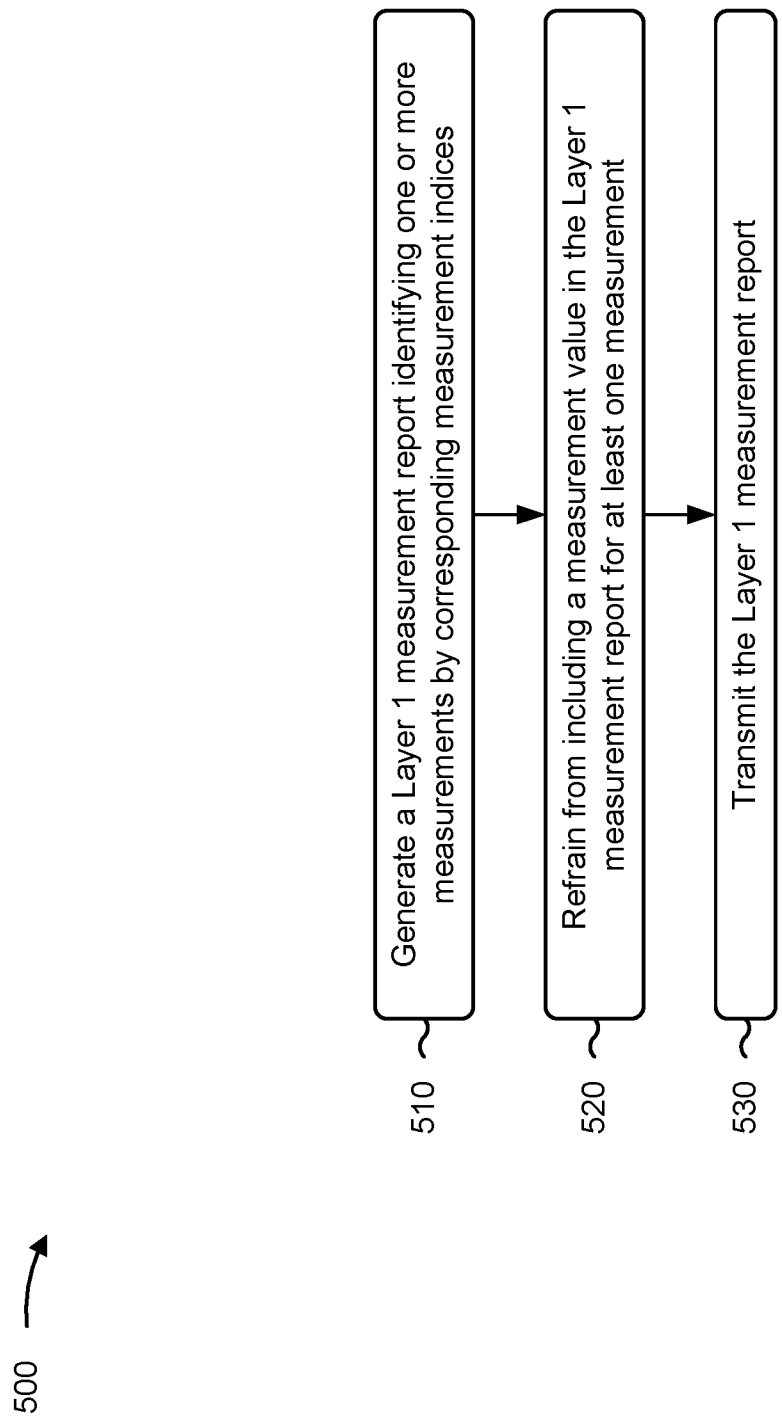
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with Layer 1 measurement reporting using measurement index.

As shown in FIG. 5, in some aspects, process 500 may include generating a Layer 1 measurement report identifying one or more measurements by corresponding measurement indices (block 510). For example, the UE (e.g., using receive processor 258, transmit processor 264, controller/processor 280, and/or memory 282) may generate a Layer 1 measurement report identifying one or more measurements by corresponding measurement indices, as described above.

As further shown in FIG. 5, in some aspects, process 500 may include refraining from including a measurement value in the Layer 1 measurement report for at least one measurement (block 520). For example, the UE (e.g., using receive processor 258, transmit processor 264, controller/processor 280, and/or memory 282) may refrain from including a measurement value in the Layer 1 measurement report for at least one measurement, as described above.

As further shown in FIG. 5, in some aspects, process 500 may include transmitting the Layer 1 measurement report (block 530). For example, the UE (e.g., using receive processor 258, transmit processor 264, controller/processor 280, and/or memory 282) may transmit the Layer 1 measurement report, as described above.

Process 500 may include additional aspects, such as any single aspect or any combination of aspects described below and/or in connection with one or more other processes described elsewhere herein.

In a first aspect, refraining from including a measurement value in the Layer 1 measurement report for at least one measurement comprises refraining from including a measurement value in the Layer 1 measurement report for at least one measurement based at least in part on a channel state information report setting associated with the at least one measurement.

In a second aspect, alone or in combination with the first aspect, process 500 includes including a measurement value in the Layer 1 measurement report for at least one other measurement based at least in part on a channel state information report setting associated with the at least one other measurement.

In a third aspect, alone or in combination with one or more of the first and second aspects, refraining from including a measurement value in the Layer 1 measurement report for at least one measurement comprises refraining from including a measurement value in the Layer 1 measurement report for each measurement included in the Layer 1 measurement report.

In a fourth aspect, alone or in combination with one or more of the first through third aspects, transmitting the Layer 1 measurement report comprises transmitting an indication that the UE has refrained from including the measurement value in the Layer 1 measurement report for the at least one measurement.

In a fifth aspect, alone or in combination with one or more of the first through fourth aspects, process 500 includes generating a different Layer 1 measurement report including one or more measurements and a measurement value for each of the one or more measurements; and transmitting the different Layer 1 measurement report using a first set of PUCCH resources, wherein transmitting the Layer 1 measurement report comprises transmitting the Layer 1 measurement report using a second set of PUCCH resources.

In a sixth aspect, alone or in combination with one or more of the first through fifth aspects, process 500 includes determining one or more measurement values for the one or more measurements, wherein generating the Layer 1 measurement report identifying the one or more measurements by corresponding measurement indices comprises ordering the one or more measurements in the Layer 1 measurement report based at least in part on determining the one or more measurement values for the one or more measurements.

In a seventh aspect, alone or in combination with one or more of the first through sixth aspects, ordering the one or more measurements in the Layer 1 measurement report comprises ordering the one or more measurements in the Layer 1 measurement report from a highest measurement value to a lowest measurement value.

In an eighth aspect, alone or in combination with one or more of the first through seventh aspects, process 500 includes receiving an indication of an order of measurements for the Layer 1 measurement report, wherein ordering the one or more measurements in the Layer 1 measurement report comprises ordering the one or more measurements in the Layer 1 measurement report based at least in part on the indication of the order of measurements for the Layer 1 measurement report.

In a ninth aspect, alone or in combination with one or more of the first through eighth aspects, process 500 includes determining a quantity of measurements to be included in the Layer 1 measurement report based at least in part on a channel state information report setting, wherein generating the Layer 1 measurement report identifying one or more measurements by corresponding measurement indices comprises performing one or more measurements indicating respective measurement values; determining a quantity of highest measurement values from the respective measurement values based at least in part on the quantity of measurements to be included in the Layer 1 measurement report; and generating the Layer 1 measurement report identifying the quantity of measurements, associated with the quantity of highest measurement values, by corresponding measurement indices.

In a tenth aspect, alone or in combination with one or more of the first through ninth aspects, process 500 includes determining a threshold measurement value associated with a channel state information report setting; performing one or more measurements indicating respective measurement values; and determining that one or more of the respective measurement values satisfy the threshold measurement value, wherein generating the Layer 1 measurement report identifying one or more measurements by corresponding measurement indices comprises generating the Layer 1 measurement report identifying one or more measurements, associated with the one or more of the respective measurement values that satisfy the threshold measurement value, by corresponding measurement indices.

In an eleventh aspect, alone or in combination with one or more of the first through tenth aspects, process 500 includes determining a quantity of measurements to be included in the Layer 1 measurement report based at least in part on a channel state information report setting; and determining that a quantity of the one or more of the respective measurement values that satisfy the threshold measurement value is less than the quantity of measurements to be included in the Layer 1 measurement report, wherein generating the Layer 1 measurement report identifying one or more measurements by corresponding measurement indices comprises generating the Layer 1 measurement report including: a quantity of measurements, associated with the quantity of the one or more of the respective measurement values that satisfy the threshold measurement value, identified by corresponding measurement indices; and a quantity of measurements identified by a plurality of zero bits, wherein the quantity of measurements identified by the plurality of zero bits is based at least in part on the quantity of measurements to be included in the Layer 1 measurement report.

In a twelfth aspect, alone or in combination with one or more of the first through eleventh aspects, the Layer 1 measurement report is at least one of: a Layer 1 reference signal receive power measurement report, or a Layer 1 signal-to-interference-plus-noise ratio measurement report.

In a thirteenth aspect, alone or in combination with one or more of the first through twelfth aspects, a measurement index of the measurement indices is: a channel state information reference signal resource indicator, or a synchronization signal block resource indicator.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
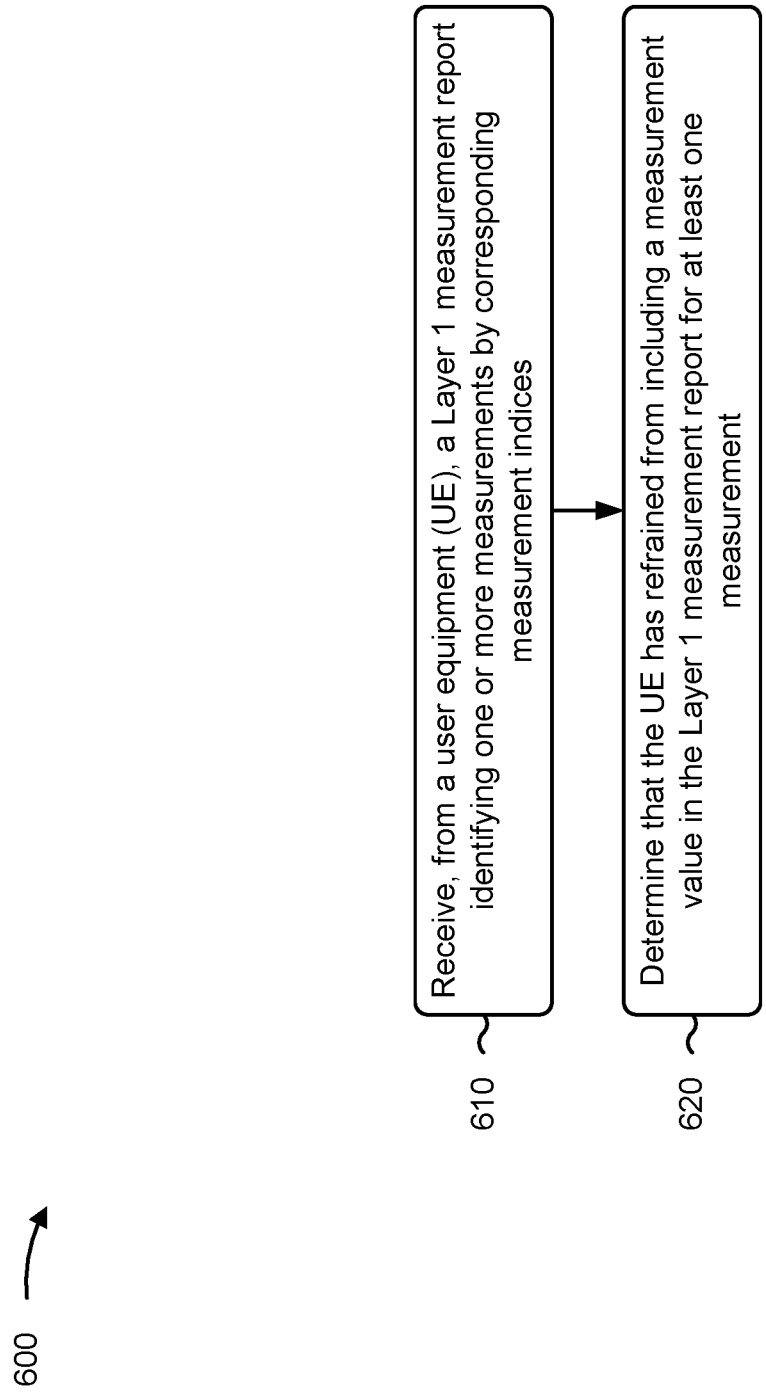
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with Layer 1 measurement reporting using measurement index.

As shown in FIG. 6, in some aspects, process 600 may include receiving, from a UE, a Layer 1 measurement report identifying one or more measurements by corresponding measurement indices (block 610). For example, the base station (e.g., using transmit processor 220, receive processor 238, controller/processor 240, and/or memory 242) may receive, from a UE, a Layer 1 measurement report identifying one or more measurements by corresponding measurement indices, as described above.

As further shown in FIG. 6, in some aspects, process 600 may include determining that the UE has refrained from including a measurement value in the Layer 1 measurement report for at least one measurement (block 620). For example, the base station (e.g., using transmit processor 220, receive processor 238, controller/processor 240, and/or memory 242) may determine that the UE has refrained from including a measurement value in the Layer 1 measurement report for at least one measurement, as described above.

Process 600 may include additional aspects, such as any single aspect or any combination of aspects described below and/or in connection with one or more other processes described elsewhere herein.

In a first aspect, process 600 includes transmitting, to the UE, an indication of a channel state information report setting associated with the Layer 1 measurement report, wherein determining that the UE has refrained from including a measurement value in the Layer 1 measurement report for at least one measurement is based at least in part on the channel state information report setting associated with the Layer 1 measurement report.

In a second aspect, alone or in combination with the first aspect, process 600 includes determining that the UE has included a measurement value in the Layer 1 measurement report for at least one other measurement.

In a third aspect, alone or in combination with one or more of the first and second aspects, process 600 includes determining that the UE has refrained from including a measurement value in the Layer 1 measurement report for each measurement included in the Layer 1 measurement report.

In a fourth aspect, alone or in combination with one or more of the first through third aspects, determining that the UE has refrained from including a measurement value in the Layer 1 measurement report for at least one measurement comprises determining that the UE has refrained from including a measurement value in the Layer 1 measurement report using a blind detection technique.

In a fifth aspect, alone or in combination with one or more of the first through fourth aspects, determining that the UE has refrained from including a measurement value in the Layer 1 measurement report for at least one measurement comprises receiving, from the UE, an indication that the UE has refrained from including the measurement value in the Layer 1 measurement report for the at least one measurement, and determining that the UE has refrained from including a measurement value in the Layer 1 measurement report for at least one measurement based at least in part on receiving the indication.

In a sixth aspect, alone or in combination with one or more of the first through fifth aspects, determining that the UE has refrained from including a measurement value in the Layer 1 measurement report for at least one measurement comprises receiving the Layer 1 measurement report using a set of PUCCH resources, and determining that the UE has refrained from including a measurement value in the Layer 1 measurement report for at least one measurement based at least in part on the set of PUCCH resources.

In a seventh aspect, alone or in combination with one or more of the first through sixth aspects, process 600 includes determining that the one or more measurements in the Layer 1 measurement report are ordered from a highest measurement value to a lowest measurement value.

In an eighth aspect, alone or in combination with one or more of the first through seventh aspects, process 600 includes transmitting, to the UE, an indication of an order of measurements for the Layer 1 measurement report; and determining an order of one or more measurements in the Layer 1 measurement report based at least in part on the indicated order of measurements for the Layer 1 measurement report.

In a ninth aspect, alone or in combination with one or more of the first through eighth aspects, process 600 includes transmitting, to the UE, an indication of a channel state information report setting indicating a quantity of measurements to be included in the Layer 1 measurement report; determining that the Layer 1 measurement report includes a quantity of measurements that is the same as the quantity of measurements to be included in the Layer 1 measurement report; and determining that the measurements included in the Layer 1 measurement report are associated with the highest measurement values determined by the UE.

In a tenth aspect, alone or in combination with one or more of the first through ninth aspects, process 600 includes transmitting, to the UE, a channel state information report setting indicating a quantity of measurements to be included in the Layer 1 measurement report and a threshold measurement value; and determining that the one or more measurements included in the Layer 1 measurement report are associated with measurement values that satisfy the threshold measurement value.

In an eleventh aspect, alone or in combination with one or more of the first through tenth aspects, process 600 includes identifying a quantity of measurements in the Layer 1 measurement report identified by a plurality of zero bits; and determining that a quantity of measurements associated with measurement values that satisfy the threshold measurement value is less than the quantity of measurements to be included in the Layer 1 measurement report based at least in part on identifying the quantity of measurements in the Layer 1 measurement report identified by a plurality of zero bits.

In a twelfth aspect, alone or in combination with one or more of the first through eleventh aspects, the Layer 1 measurement report is at least one of: a Layer 1 reference signal receive power measurement report, or a Layer 1 signal-to-interference-plus-noise ratio measurement report.

In a thirteenth aspect, alone or in combination with one or more of the first through twelfth aspects, a measurement index of the measurement indices is: a channel state information reference signal resource indicator, or a synchronization signal block resource indicator.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: generating a Layer 1 measurement report identifying one or more measurements by corresponding measurement indices; refraining from including a measurement value in the Layer 1 measurement report for at least one measurement; and transmitting the Layer 1 measurement report.

Aspect 2: The method of Aspect 1, wherein refraining from including a measurement value in the Layer 1 measurement report for at least one measurement comprises:

refraining from including a measurement value in the Layer 1 measurement report for at least one measurement based at least in part on a channel state information report setting associated with the at least one measurement.

Aspect 3: The method of any of Aspects 1-2, further comprising: including a measurement value in the Layer 1 measurement report for at least one other measurement based at least in part on a channel state information report setting associated with the at least one other measurement.

Aspect 4: The method of any of Aspects 1-3, wherein refraining from including a measurement value in the Layer 1 measurement report for at least one measurement comprises: refraining from including a measurement value in the Layer 1 measurement report for each measurement included in the Layer 1 measurement report.

Aspect 5: The method of any of Aspects 1-4, wherein transmitting the Layer 1 measurement report comprises: transmitting an indication that the UE has refrained from including the measurement value in the Layer 1 measurement report for the at least one measurement.

Aspect 6: The method of any of Aspects 1-5, further comprising: generating a different Layer 1 measurement report including one or more measurements and a measurement value for each of the one or more measurements; and transmitting the different Layer 1 measurement report using a first set of physical uplink control channel (PUCCH) resources, wherein transmitting the Layer 1 measurement report comprises: transmitting the Layer 1 measurement report using a second set of PUCCH resources.

Aspect 7: The method of any of Aspects 1-6, further comprising: determining one or more measurement values for the one or more measurements, wherein generating the Layer 1 measurement report identifying the one or more measurements by corresponding measurement indices comprises: ordering the one or more measurements in the Layer 1 measurement report based at least in part on determining the one or more measurement values for the one or more measurements.

Aspect 8: The method of Aspect 7, wherein ordering the one or more measurements in the Layer 1 measurement report comprises: ordering the one or more measurements in the Layer 1 measurement report from a highest measurement value to a lowest measurement value.

Aspect 9: The method of Aspect 7, further comprising: receiving an indication of an order of measurements for the Layer 1 measurement report, wherein ordering the one or more measurements in the Layer 1 measurement report comprises: ordering the one or more measurements in the Layer 1 measurement report based at least in part on the indication of the order of measurements for the Layer 1 measurement report.

Aspect 10: The method of any of Aspects 1-9, further comprising: determining a quantity of measurements to be included in the Layer 1 measurement report based at least in part on a channel state information report setting, wherein generating the Layer 1 measurement report identifying the one or more measurements by corresponding measurement indices comprises: performing one or more measurements indicating respective measurement values; determining a quantity of highest measurement values from the respective measurement values based at least in part on the quantity of measurements to be included in the Layer 1 measurement report; and generating the Layer 1 measurement report identifying the quantity of measurements, associated with the quantity of highest measurement values, by corresponding measurement indices.

Aspect 11: The method of any of Aspects 1-10, further comprising: determining a threshold measurement value associated with a channel state information report setting; performing one or more measurements indicating respective measurement values; and determining that one or more of the respective measurement values satisfy the threshold measurement value, wherein generating the Layer 1 measurement report identifying the one or more measurements identified by corresponding measurement indices comprises: generating the Layer 1 measurement report identifying one or more measurements, associated with the one or more of the respective measurement values that satisfy the threshold measurement value, by corresponding measurement indices.

Aspect 12: The method of Aspect 11, further comprising: determining a quantity of measurements to be included in the Layer 1 measurement report based at least in part on a channel state information report setting; and determining that a quantity of the one or more of the respective measurement values that satisfy the threshold measurement value is less than the quantity of measurements to be included in the Layer 1 measurement report, wherein generating the Layer 1 measurement report identifying the one or more measurements by corresponding measurement indices comprises: generating the Layer 1 measurement report identifying: a quantity of measurements, associated with the quantity of the one or more of the respective measurement values that satisfy the threshold measurement value, by corresponding measurement indices; and a quantity of measurements by a plurality of zero bits, wherein the quantity of measurements identified by the plurality of zero bits is based at least in part on the quantity of measurements to be included in the Layer 1 measurement report.

Aspect 13: The method of any of Aspects 1-12, wherein the Layer 1 measurement report is at least one of: a Layer 1 reference signal receive power measurement report, or a Layer 1 signal-to-interference-plus-noise ratio measurement report.

Aspect 14: The method of any of Aspects 1-13, wherein a measurement index of the measurement indices is: a channel state information reference signal resource indicator, or a synchronization signal block resource indicator.

Aspect 15: A method of wireless communication performed by a base station, comprising: receiving, from a user equipment (UE), a Layer 1 measurement report identifying one or more measurements by corresponding measurement indices; and determining that the UE has refrained from including a measurement value in the Layer 1 measurement report for at least one measurement.

Aspect 16: The method of Aspect 15, further comprising: transmitting, to the UE, an indication of a channel state information report setting associated with the Layer 1 measurement report, wherein determining that the UE has refrained from including a measurement value in the Layer 1 measurement report for at least one measurement is based at least in part on the channel state information report setting associated with the Layer 1 measurement report.

Aspect 17: The method of any of Aspects 15-16, further comprising: determining that the UE has included a measurement value in the Layer 1 measurement report for at least one other measurement.

Aspect 18: The method of any of Aspects 15-17, further comprising: determining that the UE has refrained from including a measurement value in the Layer 1 measurement report for each measurement included in the Layer 1 measurement report.

Aspect 19: The method of any of Aspects 15-18, wherein determining that the UE has refrained from including a measurement value in the Layer 1 measurement report for at least one measurement comprises: determining that the UE has refrained from including a measurement value in the Layer 1 measurement report using a blind detection technique.

Aspect 20: The method of any of Aspects 15-19, wherein determining that the UE has refrained from including a measurement value in the Layer 1 measurement report for at least one measurement comprises: receiving, from the UE, an indication that the UE has refrained from including the measurement value in the Layer 1 measurement report for the at least one measurement, wherein determining that the UE has refrained from including a measurement value in the Layer 1 measurement report for at least one measurement based at least in part on receiving the indication.

Aspect 21: The method of any of Aspects 15-20, wherein determining that the UE has refrained from including a measurement value in the Layer 1 measurement report for at least one measurement comprises: receiving the Layer 1 measurement report using a set of physical uplink control channel (PUCCH) resources; and determining that the UE has refrained from including a measurement value in the Layer 1 measurement report for at least one measurement based at least in part on the set of PUCCH resources.

Aspect 22: The method of any of Aspects 15-21, further comprising: determining that the one or more measurements in the Layer 1 measurement report are ordered from a highest measurement value to a lowest measurement value.

Aspect 23: The method of any of Aspects 15-22, further comprising: transmitting, to the UE, an indication of an order of measurements for the Layer 1 measurement report; and determining an order of one or more measurements in the Layer 1 measurement report based at least in part on the indicated order of measurements for the Layer 1 measurement report.

Aspect 24: The method of any of Aspects 15-23, further comprising: transmitting, to the UE, an indication of a channel state information report setting indicating a quantity of measurements to be included in the Layer 1 measurement report; determining that the Layer 1 measurement report includes a quantity of measurements that is the same as the quantity of measurements to be included in the Layer 1 measurement report; and determining that the measurements included in the Layer 1 measurement report are associated with the highest measurement values determined by the UE.

Aspect 25: The method of any of Aspects 15-24, further comprising: transmitting, to the UE, a channel state information report setting indicating a quantity of measurements to be included in the Layer 1 measurement report and a threshold measurement value; and determining that the one or more measurements included in the Layer 1 measurement report are associated with measurement values that satisfy the threshold measurement value.

Aspect 26: The method of Aspect 25, further comprising: identifying a quantity of measurements in the Layer 1 measurement report identified by a plurality of zero bits; and determining that a quantity of measurements associated with measurement values that satisfy the threshold measurement value is less than the quantity of measurements to be included in the Layer 1 measurement report based at least in part on identifying the quantity of measurements in the Layer 1 measurement report identified by a plurality of zero bits.

Aspect 27: The method of any of Aspects 15-26, wherein the Layer 1 measurement report is at least one of: a Layer 1 reference signal receive power measurement report, or a Layer 1 signal-to-interference-plus-noise ratio measurement report.

Aspect 28: The method of any of Aspects 15-27, wherein a measurement index of the measurement indices is: a channel state information reference signal resource indicator, or a synchronization signal block resource indicator.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment (UE), comprising:
    receiving a configuration indicating at least one channel state information report setting;
    performing, in accordance with the configuration, one or more measurements indicating a first set of measurement values for a first type of reference signal and a second set of measurement values for a second type of reference signal, the first type of reference signal being an aperiodic reference signal, a semi-persistent reference signal, or a periodic reference signal;
    generating a Layer 1 measurement report that includes one or more measurement indices corresponding to the first set of measurement values, does not include the first set of measurement values, and that includes the second set of measurement values; and
    transmitting the Layer 1 measurement report.

2. The method of claim 1, wherein generating the Layer 1 measurement report comprises:
    refraining from including the first set of measurement values in the Layer 1 measurement report in association with the at least one channel state information report setting, the Layer 1 measurement report comprising a payload size that is reduced in accordance with the first set of measurements values not being included in the Layer 1 measurement report.

3. The method of claim 1, wherein the at least one channel state information report setting includes a first channel state information report setting corresponding to the first type of reference signal and a second channel state information report setting corresponding to the second type of reference signal, the first type of reference signal being a periodic reference signal, and the second type of reference signal being an aperiodic reference signal or a semi-persistent reference signal.

4. The method of claim 1, wherein generating the Layer 1 measurement report comprises:
    refraining from including a measurement value in the Layer 1 measurement report for each periodic measurement included in the Layer 1 measurement report.

5. The method of claim 1, wherein transmitting the Layer 1 measurement report comprises:
    transmitting an indication that the UE has refrained from including the first set of measurement values in the Layer 1 measurement report.

6. The method of claim 1, wherein the Layer 1 measurement report comprises a first Layer 1 measurement report, the method further comprising:
    generating a second measurement report including one or more additional measurements and a measurement value for each of the one or more additional measurements; and
    transmitting the second measurement report using a first set of physical uplink control channel (PUCCH) resources,
    wherein transmitting the Layer 1 measurement report comprises:
        transmitting the Layer 1 measurement report using a second set of PUCCH resources in association with the Layer 1 measurement report not including the first set of measurement values.

7. The method of claim 1, wherein generating the Layer 1 measurement report comprises:
    ordering the one or more measurement indices in the Layer 1 measurement report.

8. The method of claim 7, wherein ordering the one or more measurement indices comprises:
    ordering the one or more measurement indices from a highest corresponding measurement value to a lowest corresponding measurement value.

9. The method of claim 7, further comprising:
    receiving an indication of an order of measurement indices for the Layer 1 measurement report,
    wherein ordering the one or more measurement indices comprises:

ordering the one or more measurement indices in association with the indication of the order of measurement indices.

10. The method of claim 1, further comprising:
determining a quantity of measurements to be included in the Layer 1 measurement report in association with the at least one channel state information report setting,
wherein generating the Layer 1 measurement report comprises:
determining a quantity of highest measurement values, of the first set of measurement values and the second set of measurement values, in association with the quantity of measurements to be included in the Layer 1 measurement report; and
generating the Layer 1 measurement report identifying the quantity of measurements, associated with the quantity of highest measurement values, by corresponding measurement indices.

11. The method of claim 1, further comprising:
determining a threshold measurement value associated with the at least one channel state information report setting; and
determining that one or more measurement values, of the first set of measurements values and the second set of measurement values, satisfy the threshold measurement value,
wherein generating the Layer 1 measurement report comprises:
generating the Layer 1 measurement report identifying the one or more measurement values that satisfy the threshold measurement value by corresponding measurement indices.

12. The method of claim 11, further comprising:
determining a quantity of measurements to be included in the Layer 1 measurement report in association with the at least one channel state information report setting; and
determining that a quantity of the one or more measurement values that satisfy the threshold measurement value is less than the quantity of measurements to be included in the Layer 1 measurement report,
wherein generating the Layer 1 measurement report comprises:
generating the Layer 1 measurement report identifying:
a quantity of measurements, associated with the quantity of the one or more measurement values that satisfy the threshold measurement value, by corresponding measurement indices; and
a quantity of measurements by a plurality of zero bits, wherein the quantity of measurements identified by the plurality of zero bits is in association with the quantity of measurements to be included in the Layer 1 measurement report.

13. The method of claim 1, wherein the Layer 1 measurement report is at least one of:
a Layer 1 reference signal receive power measurement report, or
a Layer 1 signal-to-interference-plus-noise ratio measurement report.

14. The method of claim 1, wherein a measurement index of the one or more measurement indices is:
a channel state information reference signal resource indicator, or
a synchronization signal block resource indicator.

15. An apparatus for wireless communication at a user equipment (UE), comprising:
a processing system that includes one or more processors and one or more memories coupled with the one or more processors, the processing system configured to cause the apparatus to:
receive a configuration indicating at least one channel state information report setting;
perform, in accordance with the configuration, one or more measurements indicating a first set of measurement values for a first type of reference signal and a second set of measurement values for a second type of reference signal, the first type of reference signal being an aperiodic reference signal, a semi-persistent reference signal, or a periodic reference signal;
generate a Layer 1 measurement report that includes one or more measurement indices corresponding to the first set of measurement values, does not include the first set of measurement values, and that includes the second set of measurement values; and
transmit the Layer 1 measurement report.

16. The apparatus of claim 15, wherein the processing system, to generate the Layer 1 measurement report, is configured to cause the apparatus to:
refrain from including the first set of measurement values in the Layer 1 measurement report in association with the at least one channel state information report setting, the Layer 1 measurement report comprising a payload size that is reduced in accordance with the first set of measurement values not being included in the Layer 1 measurement report.

17. The apparatus of claim 15, wherein the at least one channel state information report setting includes a first channel state information report setting corresponding to the first type of reference signal and a second channel state information report setting corresponding to the second type of reference signal, the first type of reference signal being a periodic reference signal, and the second type of reference signal being an aperiodic reference signal or a semi-persistent reference signal.

18. The apparatus of claim 15, wherein the processing system, to generate the Layer 1 measurement report, is configured to cause the apparatus to:
refrain from including a measurement value in the Layer 1 measurement report for each periodic measurement included in the Layer 1 measurement report.

19. The apparatus of claim 15, wherein the processing system, to transmit the Layer 1 measurement report, is configured to cause the apparatus to:
transmit an indication that the UE has refrained from including the first set of measurement values in the Layer 1 measurement report.

20. The apparatus of claim 15, wherein the Layer 1 measurement report comprises a first measurement report, and wherein the processing system is further configured to cause the apparatus to:
generate a second measurement report including one or more additional measurements and a measurement value for each of the one or more additional measurements; and
transmit the second measurement report using a first set of physical uplink control channel (PUCCH) resources,
wherein the processing system, to transmit the Layer 1 measurement report, is configured to:
transmit the Layer 1 measurement report using a second set of PUCCH resources in association with the Layer 1 measurement report not including the first set of measurement values.

21. The apparatus of claim 15,
wherein the processing system, to generate the Layer 1 measurement report, is configured to cause the apparatus to:
order the one or more measurement indices in the Layer 1 measurement report.

22. The apparatus of claim 21, wherein the processing system, to order the one or more measurement indices, is configured to cause the apparatus to:
order the one or more measurement indices from a highest corresponding measurement value to a lowest corresponding measurement value.

23. The apparatus of claim 21, wherein the processing system is further configured to cause the apparatus to:
receive an indication of an order of measurement indices for the Layer 1 measurement report,
wherein the processing system, to order the one or more measurement indices, is configured to cause the apparatus to:
order the one or more measurement indices in association with the indication of the order of measurement indices.

24. The apparatus of claim 15, wherein the processing system is further configured to cause the apparatus to:
determine a quantity of measurements to be included in the Layer 1 measurement report in association with the at least one channel state information report setting,
wherein the processing system, to generate the Layer 1 measurement report, is configured to cause the apparatus to:
determine a quantity of highest measurement values, of the first set of measurement values and the second set of measurement values, in association with the quantity of measurements to be included in the Layer 1 measurement report; and
generate the Layer 1 measurement report identifying the quantity of measurements, associated with the quantity of highest measurement values, by corresponding measurement indices.

25. The apparatus of claim 15, wherein the processing system is further configured to cause the apparatus to:
determine a threshold measurement value associated with the at least one channel state information report setting; and
determine that one or more measurement values, of the first set of measurements values and the second set of measurements values, satisfy the threshold measurement value,
wherein the processing system, to generate the Layer 1 measurement report, is configured to cause the apparatus to:
generate the Layer 1 measurement report identifying the one or more measurement values that satisfy the threshold measurement value by corresponding measurement indices.

26. The apparatus of claim 25, wherein the processing system is further configured to cause the apparatus to:
determine a quantity of measurements to be included in the Layer 1 measurement report in association with the at least one channel state information report setting; and
determine that a quantity of the one or more measurement values that satisfy the threshold measurement value is less than the quantity of measurements to be included in the Layer 1 measurement report,
wherein the processing system, to generate the Layer 1 measurement report, is configured to cause the apparatus to:
generate the Layer 1 measurement report identifying:
a quantity of measurements, associated with the quantity of the one or more measurement values that satisfy the threshold measurement value, by corresponding measurement indices; and
a quantity of measurements by a plurality of zero bits, wherein the quantity of measurements identified by the plurality of zero bits is in association with the quantity of measurements to be included in the Layer 1 measurement report.

27. The apparatus of claim 15, wherein the Layer 1 measurement report is at least one of:
a Layer 1 reference signal receive power measurement report, or
a Layer 1 signal-to-interference-plus-noise ratio measurement report.

28. The apparatus of claim 15, wherein a measurement index of the one or more measurement indices is:
a channel state information reference signal resource indicator, or
a synchronization signal block resource indicator.

29. A non-transitory computer-readable medium storing a set of instructions for wireless communication, the set of instructions comprising:
one or more instructions that, when executed at a user equipment (UE), cause the UE to:
receive a configuration indicating at least one channel state information report setting;
perform, in accordance with the configuration, one or more measurements indicating a first set of measurement values for a first type of reference signal and a second set of measurement values for a second type of reference signal, the first type of reference signal being an aperiodic reference signal, a semi-persistent reference signal, or a periodic reference signal;
generate a Layer 1 measurement report that includes one or more measurement indices corresponding to the first set of measurement values, does not include the first set of measurement values, and that includes the second set of measurement values; and
transmit the Layer 1 measurement report.

30. An apparatus for wireless communication, comprising:
means for receiving a configuration indicating at least one channel state information report setting;
means for performing, in accordance with the configuration, one or more measurements indicating a first set of measurement values for a first type of reference signal and a second set of measurement values for a second type of reference signal, the first type of reference signal being an aperiodic reference signal, a semi-persistent reference signal, or a periodic reference signal;
means for generating a Layer 1 measurement report that includes one or more measurement indices corresponding to the first set of measurement values, does not include the first set of measurement values, and that includes the second set of measurement values; and
means for transmitting the Layer 1 measurement report.

* * * * *